UNITED STATES PATENT OFFICE.

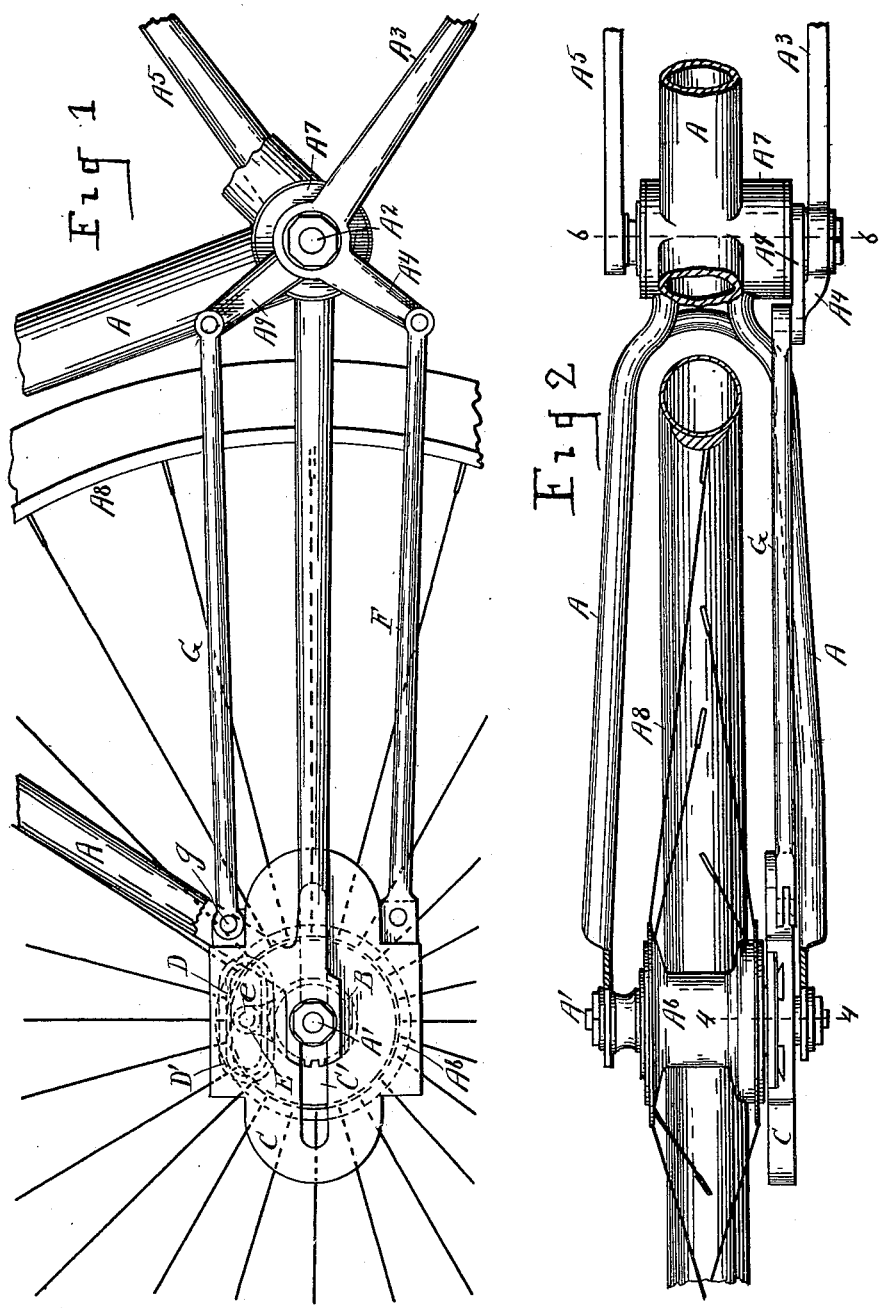

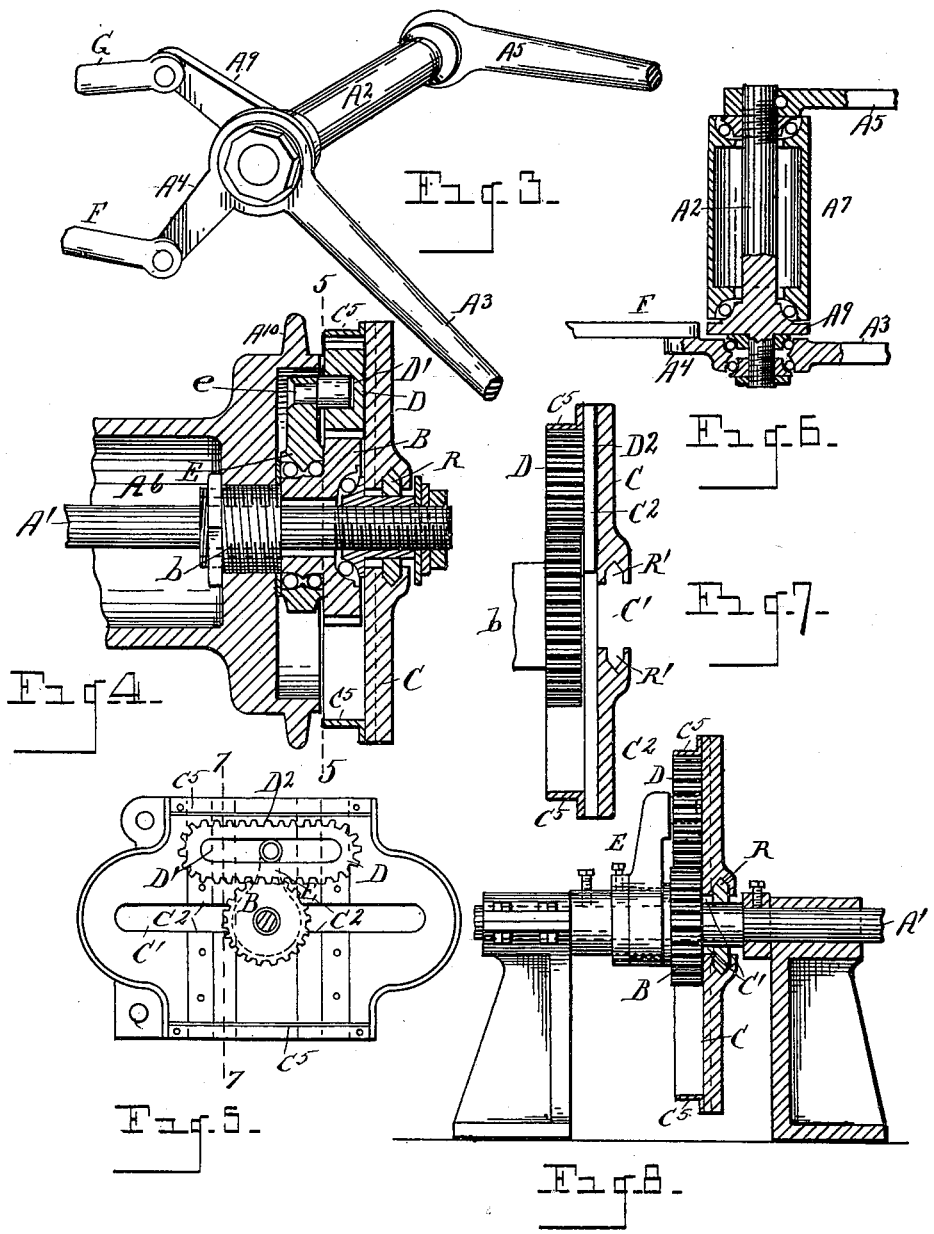

SAMUEL N. RAPP, OF DETROIT, MICHIGAN, ASSIGNOR TO THE IVES-RAPP MANUFACTURING COMPANY, OF SAME PLACE.

DRIVING MECHANISM.

SPECIFICATION forming part of Letters Patent No. 641,797, dated January 23, 1900.

Application filed January 16, 1899. Serial No. 702,223. (No model.)

*To all whom it may concern:*

Be it known that I, SAMUEL N. RAPP, a citizen of the United States, residing at Detroit, county of Wayne, State of Michigan, have invented a certain new and useful Improvement in Mechanical Movements and Driving Mechanism; and I declare the following to be a full, clear, and exact description of the invention, such as will enable others skilled in the art to which it appertains to make and use the same, reference being had to the accompanying drawings, which form a part of this specification.

This invention has for its object a novel mechanical movement and driving mechanism.

My present invention includes certain features embodied in an application filed by me in the United States Patent Office September 13, 1897, Serial No. 651,489, while it also embraces certain modifications thereof and additions thereto.

In the drawings, Figure 1 is a view in side elevation showing parts of a bicycle embodying the invention. Fig. 2 is a plan view showing various parts of a bicycle. Fig. 3 is a view in perspective illustrating features of the invention. Fig. 4 is a view in section on the line 4 4, Fig. 2. Fig. 5 is a view in section on the line 5 5, Fig. 4. Fig. 6 is a view in section on the line 6 6, Fig. 2. Fig. 7 is a view in section on the line 7 7, Fig. 5. Fig. 8 is a view in section showing the pinion engaged directly upon a shaft or axle.

My invention is of special utility for various purposes and is herewith illustrated and described as applied to the propulsion of bicycles and also for driving a shaft or axle.

As applied to bicycles the invention contemplates, as in the application above referred to, a novel gear to take the place of the customary sprocket mechanism for the propulsion of the wheels.

In the drawings, A represents portions of a bicycle-frame.

$A'$ is the axle of the rear wheel, the same being stationary.

$A^2$ is a rock-shaft.

$A^3$ is one of the pedal-cranks, provided with a crank-arm $A^4$, rotatably engaged upon the rock-shaft. $A^5$ is the other pedal-crank, rigidly engaged upon the rock-shaft.

$A^6$ is the hub of the rear wheel.

$A^7$ is the rock-shaft hanger.

$A^8$ denotes the rear wheel.

Upon the hub $A^6$ is engaged a pinion or gear, (indicated at B.) The pinion B is provided with a hub $b$, which may have a threaded engagement with the hub $A^6$.

C is a case constructed with a longitudinal channel $C'$ and with vertical channels, (indicated at $C^2$ $C^2$.) Two vertical channels are shown on opposite sides of the pinion, although one might be employed instead, the same projecting upward and downward above and below the channel $C'$ and intermediate the ends of the channel $C'$, the latter channel extending forward and rearward of said vertical channels. The case C is engaged astride the rear axle and arranged to be reciprocated over the axle, said axle projecting through the channel $C'$.

D is an elongated gear toothed on its outer edge, meshing with the pinion B, said elongated gear being formed with an elongated channel, (indicated at $D'$.) The gear D is provided with one or more tongues $D^2$, corresponding to the number of vertical channels $C^2$ and projecting into said vertical channels, said tongues being made reciprocatory in said vertical channels.

E is a crank loosely engaged at one end upon the hub $b$ of the pinion B, as shown in Fig. 4, the opposite end of said crank being provided with a roller or pin $e$, projecting into the elongated channel $D'$ of the elongated gear D. The object of the crank and its engagement with the gear D is to hold said gear in mesh with the pinion B, said pin or roller riding back and forth in the elongated slot $D'$. When the case C is reciprocated, it will be obvious that the elongated gear D will be carried thereby in mesh with the pinion B, causing said pinion to rotate. The rearward movement of the case will cause the elongated gear to be carried rearward until the forward end of said gear is in mesh with the pinion B, when the elongated gear will move downward in the channels $C^2$, so that the upper edge of the elongated gear will come into mesh with the pinion B. The forward movement of the case will cause the elongated gear to be carried rearward until the rear end thereof is in mesh with the pinion D, when the elongated gear will move upward in the channels $C^2$. In this manner the elongated gear will ride about the pinion B and about the axle. The pinion B and gear D are shown engaged in place on the inside of adjacent portions of the frame A. When the elongated gear is in front of the pinion, the tongues $D^2$ will rise upward in the vertical slots $C^2$, and when the elongated gear is at the rear of the pinion said tongues will ride downward in said vertical channels, the crank E holding the gear and pinion in constant mesh the one with the other. The mechanical movement hereinbefore described in connection with said case and in mesh with said pinion may be readily attached to any ordinary bicycle, although the invention is not limited to the application of said mechanical movement simply in connection with a bicycle hub or axle, as the same mechanism may be appled directly to any axle with equal facility. When the pinion B is secured to a hub, as in a bicycle, it is obvious that a hub which forms a part of the bicycle-wheel rotates, while the axle is non-rotatable. As shown in Fig. 8, the pinion is engaged directly with the axle or shaft to rotate the shaft. When the pinion is applied directly to an axle, it is obvious that the axle will be rotated by the pinion, and also that the crank E will be engaged upon the axle, as indicated in Fig. 8. As regards these particular features for driving said pinion, it should also be understood that the invention is not limited to any specific means for reciprocating the case carrying the elongated gear, as said case may be reciprocated in various ways within the scope of the present invention. The elongated gear D is in the nature of a planet-gear, and while it is preferred to have it elongated, as described hereinbefore, it is not essential in all cases that it should be of this particular form.

As shown herewith, the case C is driven by means of the pedal-cranks engaged upon the rock-shaft $A^2$, said rock-shaft being provided with an additional crank-arm $A^9$. The crank-arms $A^4$ and $A^9$ are connected to said case by connecting-rods F and G. A connecting-rod F is rigidly connected with the case at its rear end, while the connecting-rod G has a jointed connection with the case, as indicated at $g$. The crank-arms $A^4$ and $A^9$ are engaged upon the rock-shaft in such a position as to bring the pedal-lever $A^3$ and its arm $A^4$ at an angle to the arm $A^9$, as shown.

It will be obvious that when pressure is applied to the pedal-lever $A^3$ the crank-arm $A^4$ will be forced rearward, thereby forcing the case rearward proportionately, the rearward movement of the case pulling down the crank-arm $A^9$, and consequently raising the pedal-lever $A^5$, the pedal-lever $A^5$ being raised when the pedal-lever $A^3$ is depressed, and vice versa. It will be seen that when the pedal-lever $A^3$ is forced downward the case C will also be moved forward, thereby forcing the crank-arm $A^4$ forward and lifting the pedal-lever $A^3$. Thus the pedal-levers $A^3$ and $A^5$ may alternately oscillate in the operation of the driving mechanism, thereby actuating the mechanism which drives the rear wheel. It will be seen that only a rocking movement is given to the shaft $A^2$.

As above stated, instead of driving the case C by the means above explained, it may be driven in any other desired manner. When the device is applied directly to an axle, as illustrated in Fig. 8, the case C might be driven by a piston-rod, in which event the usual connecting-rod might be fastened therewith. I prefer to locate upon the axle an antifriction-roller R, the case C being preferably constructed with grooves, (indicated at $R'$,) in which the antifriction-roller rides. I also prefer to construct the hub $A^6$ with a flange $A^{10}$, within which the crank E is housed, as shown in Fig. 4, the crank being engaged upon the hub of the pinion B, the hub of the pinion being engaged with the hub $A^6$. This materially simplifies the construction, brings the parts closer together, and tends to exclude dust from the crank. I prefer also to provide the case C with a flange $C^5$, within which the pinion B and planet-gear D are housed.

What I claim as my invention is—

1. The combination of a pinion, mechanism to be turned by said pinion provided with a shaft or axle, a planet-gear to drive the pinion meshing on its periphery with said pinion, a reciprocatory case provided with a longitudinal channel through which the shaft or axle projects, and with channels projecting upwardly and downwardly from said channel, and means to reciprocate said case, the planet-gear made vertically reciprocatory in said vertical channels of the case, whereby the outer periphery of the planet-gear will be carried around and about said pinion, substantially as set forth.

2. The combination of a pinion, mechanism to be turned by said pinion provided with a shaft or axle, a planet-gear meshing on its outer periphery with the pinion, and a reciprocatory case mounted astride the axle, and means to reciprocate said case, said planet-gear having a vertically-reciprocatory engagement with said case, whereby the outer periphery of the planet-gear will be carried around and about the pinion, substantially as set forth.

3. The combination of an axle and its hub, a pinion mounted upon said hub, a channeled planet-gear to drive the pinion meshing on its periphery with said pinion, a crank-arm mounted upon the hub and working in the channel of the planet-gear, a channeled reciprocatory case astride the axle provided with vertical channels and arranged to carry the periphery of the planet-gear about the pinion, the planet-gear made vertically movable in said case, and said crank-arm housed within the hub and between the gear and pinion on the one side thereof and the hub on the other side thereof, substantially as set forth.

4. In combination, a pinion, mechanism to be turned by said pinion, a channeled planet-gear to drive the pinion having its periphery in mesh with said pinion, a crank-arm upon said mechanism working in the channel of the planet-gear, and a vertically-channeled case reciprocatory in one direction only to carry the planet-gear around about the periphery of the pinion, and means to reciprocate the case, said planet-gear having a vertical movement in the channels of the case on opposite sides of the pinion, substantially as set forth.

5. The combination of an axle and its hub, a gear toothed upon its periphery mounted upon said hub, a channeled planet-gear meshing on its periphery with the gear upon the hub, a crank-arm mounted upon the hub and working in the channel of the planet-gear, a horizontally-channeled case astride the axle provided with upwardly and downwardly projecting channels and arranged to carry the periphery of the channeled gear about the gear upon the hub and around about the axle, the planet-gear made vertically reciprocatory in said upwardly and downwardly projecting channels, for the purpose set forth.

6. The combination with an axle and its hub, of a gear mounted upon said hub, a planet-gear toothed upon its periphery in mesh with the gear upon the hub, and a horizontally-channeled reciprocatory case astride the axle and arranged to carry the periphery of the planet-gear about the periphery of the gear upon the hub, and around about the axle, said planet-gear provided with a tongue having a vertically-reciprocatory engagement with the case, for the purpose described.

In testimony whereof I sign this specification in the presence of two witnesses.

SAMUEL N. RAPP.

Witnesses:
N. S. WRIGHT,
CHAS. S. MCDONALD.